United States Patent
Friesen et al.

(10) Patent No.: US 9,032,046 B2
(45) Date of Patent: *May 12, 2015

(54) METHOD FOR PERFORMING A DYNAMIC UPDATE OF COMPOSED WEB SERVICES

(75) Inventors: Andreas Friesen, Steinfeld (DE); Michael Altenhofen, Karlsruhe (DE)

(73) Assignee: SAP SE, Walldorf (DE)

( * ) Notice: Subject to any disclaimer, the term of this patent is extended or adjusted under 35 U.S.C. 154(b) by 2247 days.

This patent is subject to a terminal disclaimer.

(21) Appl. No.: 11/344,914

(22) Filed: Jan. 31, 2006

(65) Prior Publication Data

US 2006/0173987 A1    Aug. 3, 2006

(30) Foreign Application Priority Data

Feb. 2, 2005   (EP) ..................................... 05002112

(51) Int. Cl.
    *G06F 15/16*    (2006.01)
    *H04L 29/08*    (2006.01)

(52) U.S. Cl.
    CPC ..................................... *H04L 67/16* (2013.01)

(58) Field of Classification Search
    USPC ....................................................... 709/218
    See application file for complete search history.

(56) References Cited

U.S. PATENT DOCUMENTS

| | | | |
|---|---|---|---|
| 2003/0055624 A1* | 3/2003 | Fletcher et al. | 704/2 |
| 2003/0217044 A1* | 11/2003 | Zhang et al. | 707/3 |
| 2004/0133580 A1* | 7/2004 | Liu et al. | 707/100 |
| 2004/0230636 A1* | 11/2004 | Masuoka et al. | 708/800 |

FOREIGN PATENT DOCUMENTS

| | | |
|---|---|---|
| EP | 1431875 A1 | 6/2004 |
| WO | WO-2004102417 A1 | 11/2004 |

OTHER PUBLICATIONS

Verma, K., Sivashanmugam, K., Sheth, A., Patil, A., Oundhakar, S. and Miller, J. METEOR-S WSDI: A Scalable P2P Infrastructure of Registries for Semantic Publication and Discovery of Web Services, Journal of Information Technology and Management (to appear, 2004). Isdis.cs.uga.edu/lib/download/TR03-008.pdf.*

Domingue, J., Roman, D., and Stollberg, M. Web Service Modeling Ontology (WSMO)—An Ontology for Semantic Web Services, Position paper at the W3C Workshop on Frameworks for Semantics in Web Services, Jun. 9-10, 2005, Innsbruck, Austria, Internet Archive Waybackmachine Dec. 7, 2005 www.w3.org/2005/04/FSWS/Submissions/1/wsmo_position_paper.html.*

Leymann, Web Services Flow Language (WSFL 1.0), IBM Academy of Technology, IBM Software Group, May 2001, Archived on May 15, 2003 from xml.coverpages.org/WSFL-Guide-200110.pdf.*

"European Search Report for Application EP 05 00 2112", (Aug. 1, 2005),3 pgs.

(Continued)

*Primary Examiner* — Nicholas Jensen
(74) *Attorney, Agent, or Firm* — Schwegman Lundberg & Woessner, P.A.

(57) ABSTRACT

A method performs a dynamic update of at least one composed web service within a web service environment. The composed web service relies on a set of component services which are linked to at least one goal of the composed service. The method includes publishing the at least one goal within a registry of the web service environment. The links between the component services and the at least one goal in the registry are stored, and the links dynamically updated in the case that any service change within the web service environment occurs.

17 Claims, 3 Drawing Sheets

(56) References Cited

OTHER PUBLICATIONS

Ankolekar, Anupriya, et al., "DAML-S: Web Service Description for the Semantic Web", *In: ISWC2002: 1st International Semantic Web Conference, Lecture Notes in Computer Science*, (Jun. 9, 2002),348-363.

Chun, Soon A., "Policy-Based Web Service Composition", *Proceedings of the 14th International Workshop on Research Issues on Data Engineering: Web Services for E-Commerce and E-Government Applications (RIDE '04)*, (Mar. 28, 2004),85-92.

Howard, Randy, et al., "A Knowledge-Based Framework for Dynamic Semantic Web Services Brokering and Management", *Proceedings of the 15th International Workshop on Database and Expert Systems Applications (DEXA '04)*, (2004),174-178.

Sycara, Katia, "Dynamic Discovery, Invocation and Composition of Semantic Web Services", *Proceedings, Third Hellenic Conference on AI—Methods and Applications of Artificial Intelligence (SETN 2004), Lecture Notes in Artificial Intelligence*, vol. 3025, (2004),3-12.

\* cited by examiner

METHOD FOR PERFORMING A DYNAMIC UPDATE OF COMPOSED WEB SERVICES

CLAIM OF PRIORITY

The present patent application claims the priority benefit of the filing date of European Application (EPO) No. 05002112.0 filed Feb. 2, 2005, the entire content of which is incorporated herein by reference.

TECHNICAL FIELD

The present application relates generally to the field of web services, and more particularly to a method for performing a dynamic update of a composed web service.

DESCRIPTION OF THE RELATED ART

Generally, a semantic web services discovery within a web service environment means a semantic reasoning on a knowledge base with a goal describing a required web service capability as input. A goal can be described, e.g., in a so-called web ontology language for semantic web services (OWL-S) by means of inputs and outputs. Alternatively, a goal can also be described by means of a so-called web service modeling ontology (WSMO) through postconditions and effects as it is described in the document of Dumitru Roman, Holger Lausen, Uwe Keller, et al., Web Service Modeling Ontology (WSMO). In the paper "Adding OWL-S to UDDI, implementation and throughput" N. Srinivasan, M. Paolucci, K. Sycara propose an OWL-S/UDDI matchmaker that performs a reasoning at publishing time in order to find matches of different quality between service capabilities and ontological concepts for services rely on. Such a quality can be classified for example in "exact, subsumption, plug-in, fail". Further details can be found in Naveen Srinivasan, Massimo Paolucci and Katia Sycara, "Adding OWL-S to UDDI, implementation and throughput", First International Workshop on Semantic Web Services and Web Process Composition **(SWSWPC 2004) 6-9, 2004, San Diego, Calif., USA. The found matches are stored as lists which are attached to the ontological concepts. The lists identify different qualities of the matches. According to this prior art the matching of goals and service capabilities is therefore reduced to forming intersections between service capabilities lists of the ontological concepts used within the goal.

EP 1 431 875 A1 proposes a computer-based system which includes task computing enabling users to define tasks by combining available functionality and to execute such tasks. All available functionality is abstracted to the user as a service and each service is expressed in a service description language, and the services have a semantic description associated with them. A task computing environment is disclosed which has to be understood as a framework for supporting or assisting a user in accomplishing complex tasks using the functionality at his disposal.

Katia Sycara proposes in the publication "Dynamic discovery, invocation and composition of semantic web services" (SETN 2004, LNAI 3025, pp. 3-12, 2004, Springer Verlag Berlin Heidelberg 2004) a vision of web services as autonomous semantic web services using the semantic web to support capability based discovery and interoperation at run time. A new language, called ontology web language for services is also described together with its relations with semantic web and web services.

Generally, web services which are published within a registry in a web service environment can be divided into two classes. One can distinguish between atomic web services and composed web services. In the following these web services are referred to, to simplify matters, as "atomic services" and "composed services". An atomic service does not use any further services in order to perform its functionality. A composed service relies on a set of composed or atomic services. The set of services on which a composed service relies on is called "component services". However, a composed service making an ultimate decision about the set of its component services at design time can probably become non-optimized or even unable to perform its task for different possible reasons. It is possible that after design time of the composed service new, more optimal component services may have been added to registry in the meantime. Furthermore, properties of existing services may change. It is possible that existing services within the registry become more or less optimal or usable or unusable for the composed service. There is still the possibility that existing services may be removed from the registry.

In order to protect itself from becoming less optimal or unable to perform its tasks a composed service has to discover component services in order to detect new, changed or removed services within the registry after the design time of the composed service. Then, the composed service has to select from the discovered set of available services those services which are optimized for a current execution of the composed service. This can be done according to some optimization algorithm.

At design time, a composed service discovers a component service using some goal. Since a composed service also has to be published to a registry its goals used to find appropriate component services are known to it at the publishing time and do not change as long as the service does not change or has been removed. However, the goals of a composed service used to discover its component services are hidden in its internal business logic which is also known as orchestration, and can therefore be used by the composed service itself only.

With respect to the forgoing considerations, it would be desirable, that a composed service, in order to keep its functionality optimized, would be able to discover its component services again and again.

DETAILED DESCRIPTION

Figure 1:
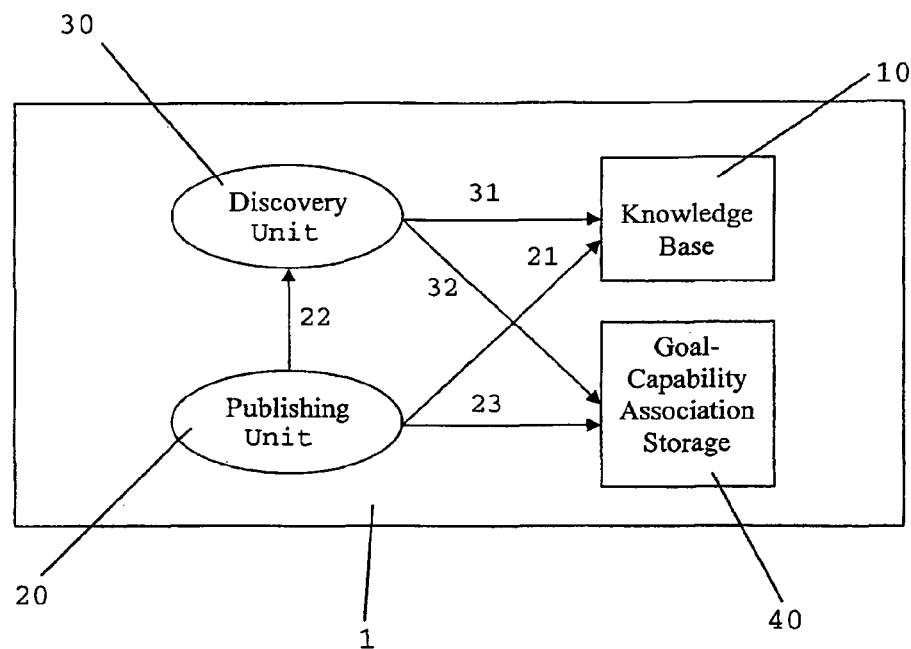
FIG. 1 shows a schematic diagram of an embodiment of a registry of the computer system according to an example embodiment.

According an example embodiment, a method for performing a dynamic update of at least one composed web service within a web service environment is provided, wherein the composed web service relies on a set of component services which are linked to at least one goal of the composed service. The example method comprises the following operations:

publishing the at least one goal of the composed service within a registry of the web service environment,
storing the links between the component services and the at least one goal in the registry, and
updating the links dynamically in the case that any service change within the web service environment occurs.

In an example embodiment, the at least one goal may be part of a web service description of the composed web service which is published within the registry.

In an example embodiment, the at least one goal of the composed service may be used to discover the initial or any new component services. Therefore, the at least one goal can be made part of a public service description of the composed service. That means that the at least one goal is public to registry within the web service environment, but not necessarily to other clients of the registry. A composed service can incorporate several different goals which should be achieved by this composed service. The publishing of the at least one goal within its public service description allows an application of a new discovery algorithm, which can reduce efforts to discover component services at invocation time significantly. In fact, if using the claimed method, a discovery process during an invocation of the composed service will take a substantially constant time in order to find a set of component services matching the goal. The overall process identifying component services takes therefore a substantially constant time for discovery plus the time for the selection from a list of services matching the goal. Such a selection time remains dependent on an internal algorithm of the composed service, which can be predefined and which is flexible and changeable by the appropriate service provider.

An additional value of having goals explicitly published in the service description is explained in the following. If the goals are known, a discovery process can be executed by a registry at the publishing time and the list of the available services matching the goal can be stored in the registry. The services matching the goal can be linked in some way to the goal. If the composed service sends later on a discovery query with its goal to a registry, the registry first tries to find the goal and returns in the case of success the list of services linked to it. Only if the goal could not be found, the registry starts a semantic discovery in the already described traditional way. This procedure does still not address the problem of detecting new, changed and removed component services which possibly impact the functionality of the composed service, since the composed service could make the discovery once and store it for the further use internally, e.g. outside of the registry.

However, when using a method, according to example embodiment, the list of available component services linked to the at least one goal of the composed service is always updated if something changes. A change can mean for example that a new service is added to a knowledge base of the web service environment, or an existing service is changed or removed from the knowledge base.

Generally, a goal presents a partial description of a service capability, e.g. in WSMO a goal is described through postconditions and effects while a service capability is described by preconditions, assumptions, postconditions and effects. This means, that if a registry can find matching service capabilities using a goal then it can also find matching goals using a service capability.

Therefore, it is possible that the updating of the links within the registry is performed in the case that either the at least one goal or the component services linked to the at least one goal change or that the at least one goal is discovered as a matching goal using service capabilities of a new service as basis for discovery.

According to a further example embodiment of the method, the respective links between the at least one goal and the component services are stored within a goal-capability association storage which forms a part of the registry.

In another embodiment, older links may be removed from the registry and replaced with youngest links when either the at least one goal is changed or new component services are discovered whose capabilities match better with the at least one goal or both one or more component services and the at least one goal are changed.

Furthermore, it is possible that a new link to the at least one goal is added to the registry when a new service is discovered whose capabilities match with the at least one goal or when the at least one goal is discovered as matching goal using service capabilities of a new service. This means that a discovery can be performed starting from a given goal in order to find an appropriate service with corresponding service capabilities or starting from service capabilities in order to find an appropriate goal which can be achieved by the service capabilities. A goal is handled with respect to discovery like a service capability, both are published within the registry of the web service environment, probably as part of the service description of a corresponding service.

According to a further example embodiment, the composed service acts as a component service with respect to at least one other composed service. That means that the composed service can act as an atomic service for other composed services. Therefore, when updating the composed service, a probable second composed service for which the first composed service acts as an atomic service has also to be updated.

Furthermore it is possible that the links are classified with respect to their matching qualities. The matching qualities can be distinguished for example whether the service fulfills exactly a goal or whether the service can be regarded only as a kind of a plug-in for the respective goal.

The present disclosure also refers to a computer system for performing dynamic updates of composed web services within a web service environment. Each of the composed web services relies on a set of component services which are linked with at least one goal of the respective composed service. The computer system comprises a plurality of services which are stored together with their service descriptions within a knowledge base, the service descriptions, each including in the case of a composed service at least one goal of the respective composed service, a publishing unit configured to add new services with their service descriptions to the knowledge base and to update or remove existing services with their service descriptions from the knowledge base, a discovery unit configured to discover within the knowledge base services starting from a given goal and goals published within the service descriptions of composed services starting from a given service capability, and an association storage configured to establish, to update and to store links between goals published within the service description of composed services and services whose capabilities match with the respective goals.

According to a possible embodiment, the publishing unit, the discovery unit, the knowledge base and the association storage are all part of a registry of the computer system.

The discovery unit provides an interface allowing execution of semantic search queries against the knowledge base. According to the computer system, the discovery unit is modified in a way such that not only a goal can be used to find service capabilities but also a service capability can be used as search criterion in order to find goals explicitly stored in the registry, namely in the knowledge base.

The discovery unit can also communicate directly with the association storage allowing discovery of links between goals and services whose capabilities match with the respective goals.

The publishing unit provides an interface to add new services or to update or remove existing services from the knowledge base of the registry. The publishing unit may be in a way allowing publishing of service descriptions which include not only service capabilities but in the case of composed services also goals which can be achieved by the respective composed service.

The publishing unit also provides an interface to the discovery unit so that the discovery unit can start discovery for a goal using the service capabilities of a new published service as a search criterion or for service capabilities using a goal probably published within the service description of a new published service as search criterion. It is also possible that the publishing unit can communicate directly with the association storage.

That means that a service description of a composed service is modified, namely extended, in a way that the goals a composed service uses to find component services are described explicitly in its service description.

The association storage of the claimed computer system is able to store associations or links between explicitly described goals in the service description of a composed service and the service descriptions of potential component services containing matching service capabilities. That means that the association storage contains for each goal a list of a plurality of component services linked with the goal.

The list can be tabulated according to matching qualities of the respective component services.

According to a possible embodiment of the computer system, the links stored within the association storage can by dynamically removed or replaced.

Also discloses is an example association storage as part of a web service environment containing a plurality of services which is configured to store associations between goals published within at least one service description of a composed service and potential component services containing service capabilities which match with those goals.

It is possible that the association storage forms a part of a registry within the web service environment.

Furthermore, it is possible that the association storage contains for each goal a list of a plurality of services linked with the goal, the list is tabulated according to matching qualities of the respective services.

In a possible embodiment of the association storage the links stored within the association storage can be dynamically removed or replaced.

When a composed web service should be published, corresponding goals which can be achieved by this composed web service are first extracted from the composed web service description. Those goal descriptions extracted from the overall web service description have afterwards to be matched with service capabilities of appropriate component services in order to generate links or associations between the composed web service to be published and the corresponding component web services. In the following a possible algorithm is shown:

```
publishService(wsd){
    choose (wsd){
```

-continued

| newAtomic: | perform | InsertNewAtomic |
| updateAtomic: | perform | UpdateAtomic |
| deleteAtomic: | perform | DeleteAtomic |
| newComposed: | perform | InsertNewComposed, InsertNewAtomic |
| updateComposed: | perform | UpdateComposed, UpdateAtomic |
| deleteComposed: | perform | DeleteComposed, DeleteAtomic |

```
    }
}
```

Within the above described algorithm there are four different essential instructions or directives which are described in the following: The first one is the instruction "InsertNewComposed" which requires to extract the goal descriptions from the web service description of the composed web service. With help of those goal descriptions the discovery unit of the computer system has to find matching service capabilities within the knowledge base of the computer system. When finding other web services with the service capabilities required those services are associated or linked with the matching goals of the composed web service. Afterwards the links between goals published within the service description of the composed service and the component services whose capabilities match with the respective goals are stored as lists within the association storage.

The instruction "UpdateComposed" corresponds to a removal of old associations between goals and services or service capabilities from the association storage. In order to update the composed web service new web services have to be found whose service capabilities match better than the previous ones and those new services have to be stored together with the appropriate links to the composed web service within the association storage. With help of such an update a further optimization is possible. It is possible that the new and old web service description version are compared in order to find differences between old and new goals of the corresponding composed web service. If a goal has not changed no action is required, e.g. no reasoning is required and the already existing association remains valid.

The wording "DeleteComposed" corresponds to a removal of associations for the goals which are contained in the web service description of the composed web service in question from the association storage.

The instruction "InsertNewAtomic" uses the discovery unit of the computer system with the service capability of the new atomic service as a search criterion in order to find matching goals within the knowledge base and store found matches to the association storage. It is important to know that in this case the search criterion is not a goal but a service capability of a service which has to be published and which could serve as a component service if a link to a composed web service can be found.

The instruction "UpdateAtomic" means the delete of old associations from the association storage of the computer system and to find with help of the discovery unit new matches between the corresponding atomic service and composed web services of the knowledge base and to store those links within the association storage.

The last instruction which is used within the described algorithm is "DeleteAtomic". This instruction corresponds to a removal of associations for the service capability contained in the web service description of a corresponding atomic service from the association storage.

A composed web service can also act as an atomic service or a component service, respectively, for other composed web services. Therefore, after an operation for the composed web service has been performed an associated operation for the atomic service must follow, associating herewith its service capability with goals of some other services.

Also disclosed is a computer program product with a computer-readable medium and a computer program stored on the computer-readable medium with a program code which is suitable for carrying out a method according to an example embodiment when the computer program is run on a computer.

Also disclosed is a computer program with program code which is suitable for carrying out a method and a computer-readable medium with a computer program stored thereon, the computer program comprising a program code which is suitable for carrying out a method according to an example embodiment when the program is run on a computer.

Further features and embodiments will become apparent from the description and the accompanying drawings.

For purposes of clarity, the present discussion refers to an abstract example of a computer system. However, the example method and the system may operate with a wide variety of types of network systems including networks and communication systems dramatically different from the specific example as illustrated in the following drawings.

It should be understood that while the invention is described in terms of a specific system, that the invention has applications in a variety of communication systems, such as advanced cable-television systems, advanced telephone networks or any other communication system that would benefit from the system or the method according to an example embodiment. IT is intended that the system as used in the specification and claims be reached to cover any communication system unless the context requires otherwise.

Example embodiments are schematically illustrated in the drawings by way of an example embodiment and is explained in detail with reference to the drawings. It is understood that the description is in no way limiting on the scope of the present invention and is merely an illustration of an example embodiment of the invention.

FIG. 1 shows a registry 1 as it can be provided within a computer system according to an example embodiment. The registry 1 comprises four main components which are linked with each other with respect to a specific coaction. The registry 1 comprises a knowledge base 10. The knowledge base 10 involves all web services which can be provided by the computer system and which can be accessed directly by a user or by a further composed service in order to achieve a corresponding sub-goal of that composed service. Furthermore, the registry comprises a publishing unit 20. The publishing unit 20 is configured to add new web services with their respective service descriptions to the knowledge base 10. The publishing unit 20 has also the task to update or remove existing services with their service description from the knowledge base 10. The publishing unit 20 provides an interface 21 to add new services or to update or remove existing web services from the knowledge base of the registry 1. The registry 1 further comprises a discovery unit 30. The discovery unit 30 is configured to discover via an interface 31 within the knowledge base 10 services in response to semantic search queries against the knowledge base 10. The discovery unit 30 is configured such that not only a goal can be used to find a service capability but also a service capability can be used as a search criterion in order to find goals which are included within a service description and therefore stored together with the corresponding service within the knowledge base 10. The publishing unit 20 also provides an interface 22 to the discovery unit 30 so that the discovery unit 30 can start discovery of a goal using the service capabilities of a new published service as a search criterion or of service capabilities using a goal probably published in the service description of a new published service as search criterion. The registry 1 further provides association storage 40. The association storage 40 is able to store associations (links) between explicitly described goals which are part of a service description of a composed service and the service descriptions of potential component services, containing matching service capabilities. The association storage 40 is illustrated and further described in the following FIG. 2. It has to be noted that the service description of a composed service is extended in a way that goals which should be achieved by the composed service are also explicitly described and explained within the service description and used to find component services in order to compose the composed service and to associate the goals with the respective service description of the found component services.

The publishing unit 20 can also communicate directly via an interface 23 with the association storage 40 in order to add new links or to update or remove existing links from the association storage 40. The discovery unit 30 also provides an interface 32 to the association storage 40 allowing discovery of links as reaction of semantic search queries.

Figure 2:
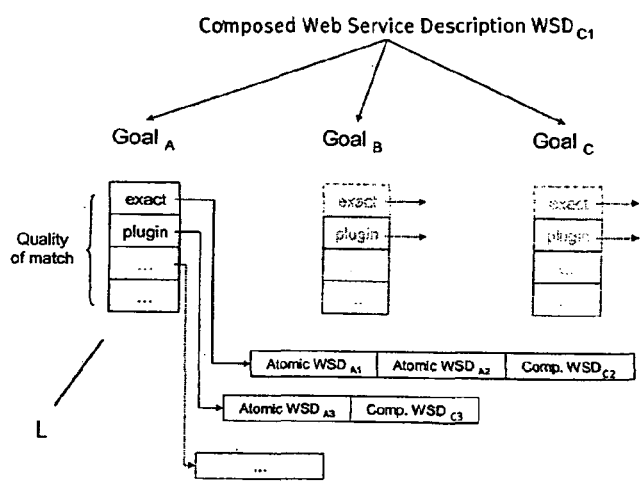
FIG. 2 shows a schematic diagram of a possible embodiment of the method according to an example embodiment.

FIG. 2 shows a possible embodiment of a method according to an example embodiment. A composed web service C1 possesses, like all kind of the services, a specific web service description $WSD_{C1}$. According to an example embodiment, the composed web service description $WSD_{C1}$ not only includes the service capabilities but also the goals which can be achieved by using that composed web service C1. The overall goal which can be achieved by the composed web service C1 can be divided as indicated in FIG. 2 into three sub-goals $Goal_A$, $Goal_B$ and $Goal_C$. These goals are published in connection with the service capabilities as an overall composed web service description $WSD_{C1}$ within a registry of the computer system. The computer system further contains a knowledge base in which a plurality of services is stored. For each of the three goals component services are discovered among the plurality of services whose capabilities match with the specific goal. As it is shown example for $Goal_A$ the discovered component services can be linked with the $Goal_A$ according to their matching qualities. Those services whose capabilities match best with $Goal_A$ are designed as exactly matching $Goal_A$. In the illustrated case these are atomic service A1 with web service description $WSD_{A1}$, atomic service A2 with web service description $WSD_{A2}$ and composed service C2 with web service description $WSD_{C2}$. Not exactly matching but being considered as "plug-in" are atomic service A3 with web service description $WSD_{A3}$ and composed service C3 with web service description $WSD_{C3}$ which are linked with $Goal_A$. This kind of arrangement can be continued. A list L containing all possible links which are ordered with respect to their matching qualities can be stored in an association storage of the computer system. The same procedure namely the discovery of component services can be performed for $Goal_B$ and $Goal_C$. As it can be recognized in this case a composed service can also act as an atomic service, namely as a component service for other composed services. In the illustrated case the composed services C2 and C3 can be regarded as atomic services with respect to composed service C1, because their composed web service descriptions $WSD_{C2}$ and $WSD_{C3}$ can be linked with $Goal_A$ of composed web service C1. Probably, C1 itself can also act as atomic service for some further composed service C4. Therefore, after the operation for the composed service C1 has been performed, an associated operation for the atomic service must follow, associated herewith its service capability with goals of some other services.

Figure 3:
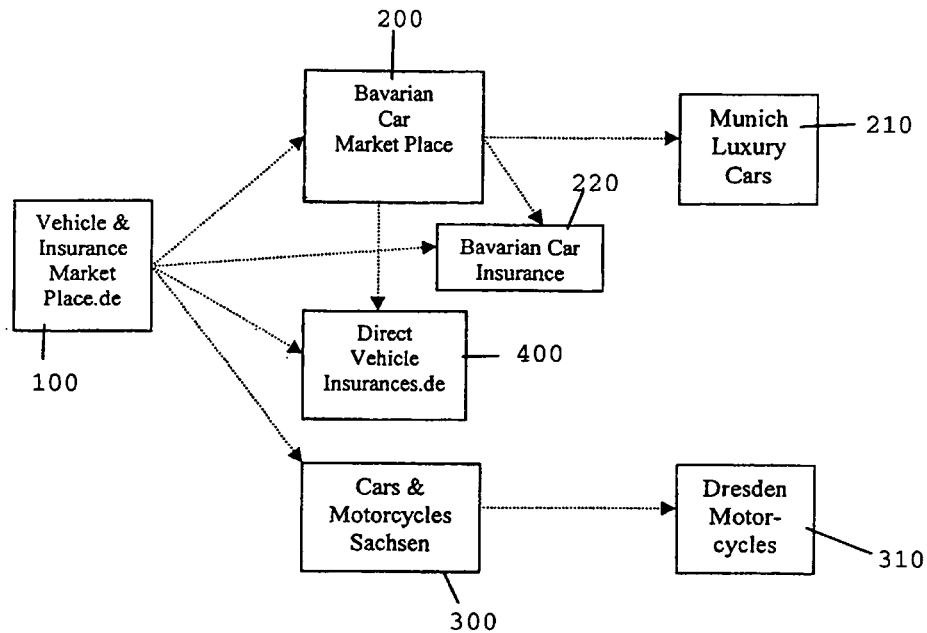
FIG. 3 shows a schematic diagram of a possible scenario in which the method according to an example embodiment can be used.

FIG. 3 illustrates a possible business scenario in which an embodiment of the method according to an example embodiment can be used. In this scenario a so-called "Vehicle- & Insurance-selling Market Place.de" 100 provides a user-friendly interface to potential vehicle buyers. This interface allows a specification of a type and a preferred location of a vehicle as well as an appropriate insurance. Furthermore, it aggregates resources of potential vehicle sellers, regional vehicle-selling market places and insurances to reach a broad variety of offered vehicle types, quantity of offered vehicles, broad location coverage and appropriate insurances, so making its service attractive to potential vehicle buyers.

In the shown example the vehicle sellers are "Munich Luxury Cars" 210 and "Dresden Motorcycles" 310. The vehicle sellers as a rule are bound to a location, provide a restricted number of vehicle types and have a restricted number of vehicles on offer. There are two different regional vehicle selling market places, namely the "Bavarian Car Market Place" 200 and "Cars and Motorcycles Sachsen" 300. The regional vehicle selling market places 200 and 300 aggregate the offers of the vehicle sellers providing a broad variety and quantity of offered vehicles for a distinct region. The vehicle sellers are interested to reach as many potential vehicle buyers as possible. Therefore, they are interested to be associated with as many vehicles selling market places as possible. However, a vehicle seller has to specify its service as precise as possible in order to get a high priority as exact match as possible in a discovery and selection process of the vehicle-selling market places.

Also the vehicle insurances are interested to be connected to as many market places as possible. Also for the insurances applies, to get a high priority they have to exactly specify the vehicle types, conditions, regional restrictions concerning vehicle registration and other details. In the shown example the insurances are "Bavarian Car Insurance" 220 and "Direct Vehicle Insurances.de" 400.

The composed web service "Vehicle & Insurance Market Place.de" 100 has the following goal: "Buy vehicle in Germany. Buy vehicle insurance for a vehicle registered in Germany". The composed web service associated with the "Bavarian Car Market Place" 200 has the goal: "Buy car in Bavaria, Germany. Buy a car insurance for a car registered in Bavaria, Germany" and provides as service capability "Sell a car in Bavaria, Germany. Sell insurance for a car registered in Bavaria, Germany". The vehicle seller "Cars & Motorcycles Sachsen" 300 has the goal "Buy a car or motorcycle in Sachsen, Germany" and provides as service capability "Sell a car or motorcycle in Sachsen, Germany". The "Bavarian Car Insurances" 220 has the service capability to "Sell insurance for a car registered in Bavaria, Germany" and the "Direct Vehicle Insurances.de" 400 has the service capability "Sell insurance for a vehicle registered in Germany". The vehicle seller "Munich Luxury Cars" 210 has the service capability "Sell a luxury car in Munich, Bavaria, Germany". The vehicle seller "Dresden Motorcycles" 310 has the service capability "Sell a motorcycle in Dresden, Sachsen, Germany".

In the following it is described how to proceed in the case that none of the above services is published yet. Possible associations are shown by arrows. The different vehicle types are described by the vehicle ontology (vo) and locations by the corresponding location ontology (lo) as described in FIG. 4. In a first operation all the described insurance services are published by a publishing unit. Since the insurance services are atomic the publishing unit would normally not only publish these services but also instruct a discovery unit in order to discover with the service capability of the corresponding insurance service as a search criterion in order to find matching goals and stored found matches within an appropriate association storage. This can be performed according to the already described publishing algorithm by an instruction called "InsertNewAtomic". However, since no services with goals requiring a vehicle insurance are found in the registry at this point of time the insurance services are not associated with any goals in the association storage.

In a next operation the "Vehicle & Insurance Market Place.de" service 100 is published. This service is a composed service so that a corresponding algorithm performs an already described instruction "InsertNewComposed". With help of this instruction the goals within the service description are extracted and used by the discovery unit to find matching service capabilities. The found services are linked with the new composed service and stored within a list to the association storage. In this case it means that the service 100 is linked with the both insurance services 220, 400 and those associations are stored in the association storage. Subsequent "InsertNewAtomic" finds no goals which can be associated with its service capability so no new associations are stored to the association storage.

The Sachsen and Bavarian Market Places 300, 200 are published. When performing the instruction "InsertNewComposed" no vehicle sellers are found. "Bavarian Car Market Place" 200 is associated with "Bavarian Car Insurance" 220 which corresponds to an exact match, and with "Direct Vehicle Insurances.de" 400 which is not an exact match but which can be designated as an "subsume". The instruction "InsertNewAtomic" stores now associations of "plug-in" quality to "Vehicle & Insurance Market Place.de" 100 for both regional market places, namely the "Cars and Motorcycles Sachsen" 300 and the "Bavarian Car Market Place" 200.

Finally, the Munich and Dresden sellers namely the "Munich Luxury Cars" 210 and the "Dresden Motorcycles" 310 are published. The instruction "InsertNewAtomic" provides associations to their regional market place, respectively.

The "Vehicle & Insurance Market Place.de" 100 is now enabled to sell Luxury Cars in Bavaria and Motorcycles in Sachsen and can sell appropriate insurances. In case that "Dresden Motorcycles" 310 extends its offer and changes its capability to "Sell a car and motorcycle in Dresden, Sachsen, Germany", the instruction "UpdateAtomic" will update the association with the "Cars & Motorcycles Sachsen" 300 enabling the "Vehicle & Insurance Market Place.de" 100 to sell not only motorcycles but also different types of cars in Sachsen.

In case that "Direct Vehicle Insurances.de" 400 removes its service, the instruction "DeleteAtomic" removes associations to "Bavarian Market Place" 200 and "Vehicle & Insurance Market Place.de" 100 from the association storage. This implies, that now these market places can sell insurances only for cars registered in Bavaria.

Figure 4:
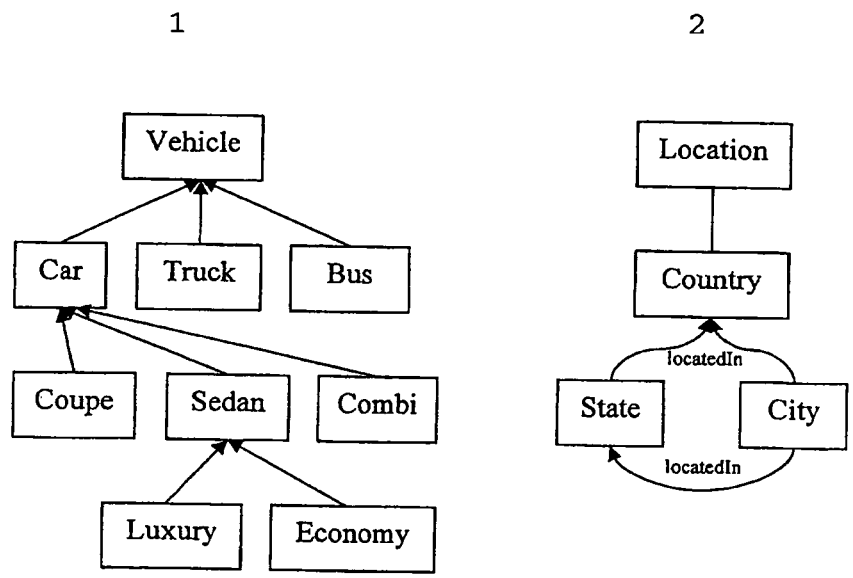
FIG. 4 shows a possible structure of ontologies with the respect of the scenario illustrated in FIG. 3 and the corresponding relationships among the ontologies.

FIG. 4 shows two structures of ontologies by which service capability descriptions and also goals which can be achieved by an appropriate service can be described. Structure 1 describes a vehicle ontology. Structure 2 shows a location ontology. Structure 1 has a tree structure. The vehicle can be subdivided or classified in "car", "truck" and "bus". A car can also be classified in "coupe", "sedan", and "kombi". This classification is indicated by respective arrows. A sedan can be "luxury" or "economy".

Structure 2 shows that a location can be classified as a "country". The "country" can contain a "city" and "state". A "city" can be located in a "state" but also directly in a "country". Therefore, there is a direct association between a city and a country and also between a state and a country, but also between a city and a state. All these three correlations are indicated by corresponding arrows.

In the following, two examples demonstrate how a goal and a service capability can be expressed in a pseudo-WSMO notation. A vehicle buyer describes its goal to buy a car in Bavaria in the following way:

Goal
nonFunctionalProperties
    description hasValue "Express the goal buy Car in Bavaria, Germany"
endNonFunctionalProperties
postcondition buyingCarInLocation
definedBy
    exists ?Vehicle, ?Location
    (?Vehicle memberOf vo:Car
    and ?Location member of lo:Location[lo:Country hasValue Germany, lo:state hasValue Bavaria])
effect havingCarDelivered (Besides the vehicle and location ontologies here is also used a purchase ontology defining concepts Delivery, Product, Buyer, . . . described in [4])
definedBy
    exists ?Delivery, ?Product, ?Buyer ?Vehicle
    (?Delivery memberOf po:delivery [po:deliveryItem hasValue ?Product, po: receiver hasValue ?Buyer]
    and ?Product memberOf po:product[po:productItem hasValue ?Vehicle]
    and ?Buyer memberOf po:Buyer
    and ?Vehicle memberOf vo:Car)

A luxury car seller in Munich describes its service capability in the following way:

Webservice
nonFunctionalProperties
    description hasValue "Sell Luxury Car in Munich, Bavaria, Germany"
endNonFunctionalProperties
capability luxuryCarDealerWSCapability
precondition . . .
assumption . . .
postcondition sellingLuxuryCarInLocation
definedBy
    forAll ?Vehicle, ?Location
    (?Vehicle memberOf vo: Luxury
    and ?Location member of lo:Location[lo:Country hasValue Germany, lo:state hasValue Bavaria, lo:city hasValue Munich])
effect havingCarDelivered (Besides the vehicle and location ontologies here is also used a purchase ontology defining concepts Delivery, Product, Buyer, . . . [4])
definedBy
    forAll ?Delivery, ?Product, ?Buyer ?Vehicle
    (?Delivery memberOf po:delivery [po:deliveryItem hasValue ?Product, po: receiver hasValue ?Buyer]
    and ?Product memberOf po:product[po:productItem hasValue ?Vehicle]
    and ?Buyer memberOf po:Buyer
    and ?Vehicle memberOf vo:Luxury)

The described service capability shows that it is possible to extract the goal from the service capability since the postconditions and effects describing a goal are also a part of a service capability. From the viewpoint of the car buyer the above service capability has the matching quality "plug-in" since it sells only luxury cars and not all types of cars as required by the goal.

Assumed that the goal is already published and the car seller publishes its new service with the above capability. The publishing unit extracts the postcondition and effect from the service capability and builds a goal. With this goal the publishing unit requests the discovery unit to match it against the goals published with composed services. In this example the quality of match will be "subsumption". However, since in this case the direction of the match was "service capability→goal" and not "goal→service capability", the found goal subsumes the service capability and therefore from the viewpoint of that goal the service capability of the luxury car seller is "plug-in".

Figure 5:
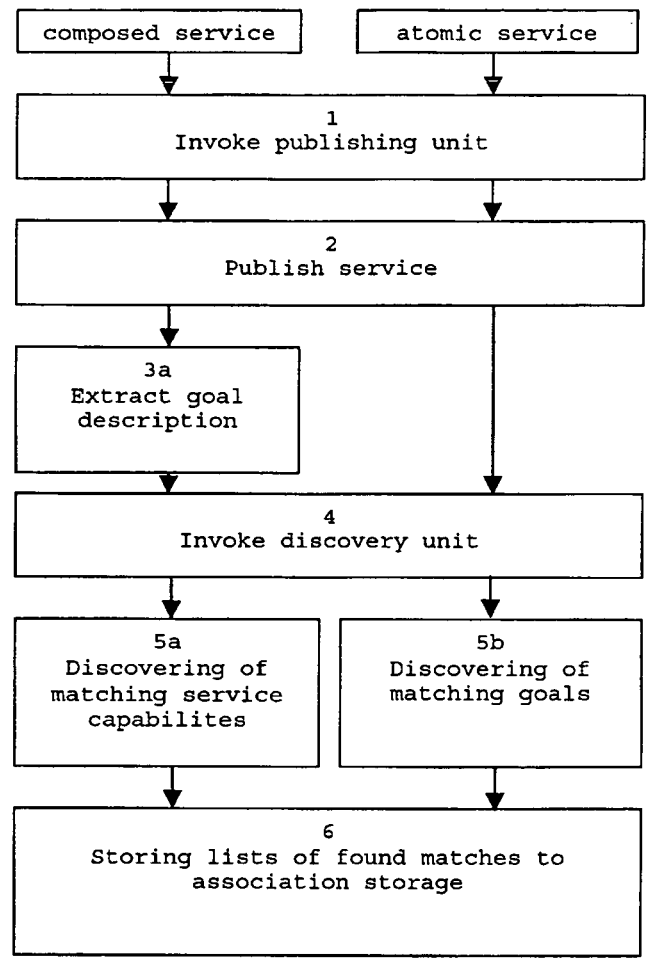
FIG. 5 shows a flowchart illustrating a further embodiment of the method according to an example embodiment.

FIG. 5 shows a flowchart of a further embodiment of the method according to an example embodiment. Two different scenarios are illustrated. There are a composed service and an atomic service both should be published and added to a corresponding web service environment. In both cases a publishing unit of the web service environment is invoked. In a second operation the services are published within a corresponding registry of the web service environment. That means that the composed service as well as the atomic service are added to an appropriate knowledge base of the registry of the web service environment. The services are published together with their corresponding web service descriptions. In the case of a composed service a goal description is also published as a part of the web service description. In a next operation, namely operation 3a, the web service description of the composed service is analyzed with respect to the incorporated goal description of the composed service. In operation 4 a discovery unit is invoked. This discovery unit is also part of the registry of the web service environment. In the case of the composed service the discovery unit is used to discover matching service capabilities of potential component services of the composed service which have already been published within the web service environment. In the case of the atomic service the discovery unit is also invoked, in that case in order to discover matching goals which are published within corresponding service descriptions of composed services which have already been published within the web service environment. In operation 6 all found matches are tabulated within corresponding lists and stored to an appropriate association storage of the web service environment.

In a further operation, which is not illustrated within the present flowchart, the composed service can now be regarded as an atomic service. This means that in its function as an atomic service the discovery unit which is invoked in operation 4 is also used not to find matching service capabilities but to discover matching goals which correspond to the service capabilities of the composed service which acts now as an atomic service. The stored lists of found matches within the association storage are always updated whenever a service change within the web service environment occurs. That means that whenever a new service is added to the knowledge base of the web service environment, the matches or links which are stored within the association storage are checked with respect to that new added service. Whenever a service is removed the lists of links are also checked with respect to the consequence of the removal of that service. The corresponding associations are also deleted. It is also possible that the lists of links are ordered hierarchically with respect to the matching quality. That means that it is also possible that a new service which is added to the knowledge base of the web service environment matches better than an older service with respect to a specific composed service. In this case the lists have also to be modified with respect to the ordering.

What is claimed is:

1. A method for performing a dynamic update of at least one composed web service within a web service environment, the method comprising:
   publishing at least one goal of the composed web service within a registry of the web service environment, the at least one goal being published within a web service description of the composed web service, the composed web service relying on a set of component services linked to the at least one goal of the composed web service;
   storing links between the set of component services and the at least one goal of the composed web service in the registry, the links being classified with respect to matching qualities of the set of component services; and
   updating the links dynamically, using one or more processors of a computer system, in the case that any service change within the web service environment occurs by adding new links, removing existing links, or replacing existing links.

2. The method according to claim 1, wherein the updating of the links is performed in the case that either the at least one goal or the component services linked to the at least one goal change or that the at least one goal is discovered as a matching goal using service capabilities of any new service as basis for discovery.

3. The method according to claim 1, wherein the respective links between the at least one goal and the component services are stored within a goal-capability association storage which forms a part of the registry.

4. The method according to claim 1, wherein older links are removed from the registry and replaced with youngest links when either the at least one goal is changed or new component services are discovered whose capabilities match better with the at least one goal or both the component services and the at least one goal are changed.

5. The method according to claim 1, wherein a new link to the at least one goal is added to the registry when a new service is discovered whose capabilities match with the at least one goal or when the at least one goal is discovered as matching goal using service capabilities of a new service.

6. The method according to claim 1, wherein a link between a component service and the at least one goal is removed when the component service is deleted.

7. The method according to claim 1, wherein the composed service is handled as a component service with respect to at least one other composed service.

8. The method according to claim 1, wherein the matching qualities comprise at least one of whether the component service fulfils a goal or whether the component service can be regarded as a plug-in for a respective goal.

9. A computer system for performing dynamic updates of composed web services within a web service environment, the computer system comprising:
   a knowledge base storing a plurality of services which are stored together with their service descriptions, the service descriptions, each including in the case of a composed web service at least one goal of the respective service, the composed web service relying on a set of component services which are linked with the at least one goal of the composed web service, the links being classified with respect to matching qualities of the set of component services;
   a publishing unit to add new services with their service descriptions to the knowledge base and to update or remove existing services with their service descriptions from the knowledge base;
   a discovery unit to discover within the knowledge base services starting from a given goal and goals published within the web service descriptions of composed web services starting from a given service capability; and
   an association storage to establish, to update, and to store links between goals published within the web service descriptions of composed web services and services whose capabilities match with the respective goals.

10. The computer system according to claim 9, wherein the publishing unit, the discovery unit, the knowledge base and the association storage are all part of a registry of the computer system.

11. The computer system according to claim 9, wherein the matching qualities comprise at least one of whether the component service fulfils a goal or whether the component service can be regarded as a plug-in for a respective goal.

12. The computer system according to claim 9, wherein the association storage contains for each goal a list of a plurality of component services linked with the goal, the list is tabulated according to matching qualities of the respective component services.

13. The computer system according to claim 9, wherein the links stored within the association storage can be dynamically removed or replaced.

14. A computer program product with a non-transitory computer-readable storage medium and a computer program stored on the non-transitory computer-readable storage medium with a program code which is suitable for carrying out a method when the computer program is run on a computer, the method comprising:
   publishing the at least one goal of the composed web service within a registry of the web service environment, the at least one goal being published within a web service description of the composed web service, the composed web service relying on a set of component services which are linked with the at least one goal of the composed web service;
   storing the links between the set of component services and the at least one goal of the composed web service in the registry, the links being classified with respect to matching qualities of the set of component services; and
   updating the links dynamically, using one or more processors of a computer system, in the case that any service change within the web service environment occurs by adding new links, removing existing links, or replacing existing links.

15. A non-transitory computer-readable storage medium storing instruction which when executed by one or more processors performs a method comprising:
   publishing at least one goal of the composed web service within a registry of the web service environment, the at least one goal being published within a web service description of the composed web service, the composed web service relying on a set of component services linked to the at least one goal of the composed web service;
   storing the links between the set of component services and the at least one goal of the composed web service in the registry, the links being classified with respect to matching qualities of the set of component services; and
   updating the links dynamically, using one or more processors, in the case that any service change within the web service environment occurs by adding new links, removing existing links, or replacing existing links.

16. The method of claim 1, further comprising using the at least one goal of the composed service to discover initial or new component services.

17. The method of claim 1, further comprising determining a goal of the at least one goal based on a discovery query and returning a list of component services linked to the determined goal.

* * * * *